US007274951B2

United States Patent
Maruta (10) Patent No.: US 7,274,951 B2
(45) Date of Patent: Sep. 25, 2007

(54) MULTI-BEAM ANTENNA TRANSMITTER/RECEIVER AND TRANSMITTING/RECEIVING METHOD AND TRANSMISSION BEAM SELECTION METHOD

(75) Inventor: Yasushi Maruta, Tokyo (JP)

(73) Assignee: NEC Corporation, Tokyo (JP)

( * ) Notice: Subject to any disclaimer, the term of this patent is extended or adjusted under 35 U.S.C. 154(b) by 187 days.

(21) Appl. No.: 10/509,017

(22) PCT Filed: Feb. 19, 2003

(86) PCT No.: PCT/JP03/01791

§ 371 (c)(1),
(2), (4) Date: Sep. 27, 2004

(87) PCT Pub. No.: WO03/081805

PCT Pub. Date: Oct. 2, 2003

(65) Prior Publication Data

US 2005/0153657 A1 Jul. 14, 2005

(30) Foreign Application Priority Data

Mar. 27, 2002 (JP) ............................. 2002-088967

(51) Int. Cl.
*H04B 1/38* (2006.01)
*H04M 1/00* (2006.01)
(52) U.S. Cl. .................. 455/562.1; 342/369; 342/373; 342/368
(58) Field of Classification Search ............. 455/562.1; 342/369, 373, 372, 368
See application file for complete search history.

(56) References Cited

U.S. PATENT DOCUMENTS

| 6,240,149 | B1 * | 5/2001 | Yukitomo et al. | 375/347 |
| 6,580,394 | B2 * | 6/2003 | Wang et al. | 342/458 |
| 6,728,554 | B1 * | 4/2004 | Wegner | 455/562.1 |
| 6,754,512 | B1 * | 6/2004 | Iinuma | 455/562.1 |
| 7,054,929 | B2 * | 5/2006 | Irie et al. | 709/225 |
| 7,058,418 | B2 * | 6/2006 | Doi et al. | 455/500 |
| 7,062,273 | B2 * | 6/2006 | Obayashi | 455/436 |
| 2001/0049295 | A1 * | 12/2001 | Matsuoka et al. | 455/562 |

FOREIGN PATENT DOCUMENTS

| JP | 05-41607 | 2/1993 |
| JP | 10-285092 | 10/1998 |
| JP | 2001-251233 | 9/2001 |

* cited by examiner

*Primary Examiner*—Joseph Feild
*Assistant Examiner*—Kwasi Karikari
(74) *Attorney, Agent, or Firm*—Whitham Curtis Christofferson & Cook, PC (57) ABSTRACT

A multi-beam antenna transmitter/receiver includes reception beam formation units ($104_1$-$104_M$) which form a plurality of reception beams, and transmission beam formation units ($113_1$-$113_J$) which form a plurality of transmission beams. The multi-beam antenna transmitter/receiver further includes reception beam calculation units ($108_1$-$108_M$) which calculate overall reception qualities from the reception qualities for the path delays of user signals for respective reception beams, and a transmission beam selection unit (109) which selects a reception beam excellent in overall reception quality and selects a transmission beam having a direction which coincides with or is close to the direction of the selected reception beam. An optimum transmission beam can be selected even in the multipath environment.

20 Claims, 7 Drawing Sheets

| USER NUMBER | RECEPTION BEAM NUMBER | PATH DELAY | RECEPTION QUALITY | OVERALL RECEPTION QUALITY |
|---|---|---|---|---|
| 1 | 1 | A B C D | 10 1 | 11 |
|  | 2 | E F G H | 8 5 | 13 |
| 2 ⋮ L |  |  |  |  |

FIG. 3

| RECEPTION BEAM DIRECTION $\theta_{UL}$ (°) | RECEPTION BEAM NUMBER | TRANSMISSION BEAM DIRECTION $\theta_{DL}$ (°) | TRANSMISSION BEAM NUMBER |
|---|---|---|---|
| 20 | 1 | 30 | 1 |
| 40 | 2 | | |
| 60 | 3 | 70 | 2 |
| 80 | 4 | | |
| ⋮ | ⋮ | ⋮ | ⋮ |
| 140 | M-1 | 150 | J |
| 160 | M | | |

MULTI-BEAM ANTENNA TRANSMITTER/RECEIVER AND TRANSMITTING/RECEIVING METHOD AND TRANSMISSION BEAM SELECTION METHOD

BACKGROUND OF THE INVENTION

The present invention relates to an array antenna transmitter/receiver which suppresses interference with another user by control of antenna directivity and, more particularly, to a multi-beam antenna transmitter/receiver, transmitting/receiving method, and transmission beam selection method which select transmission/reception directivity from a plurality of fixed directional patterns (multi beams).

In a cellular mobile communication system and the like, it has been examined to apply a method of forming a directional pattern (beam) which increases the transmission/reception gain in a desired signal direction and decreases it in another direction by using an array antenna transmitter/receiver including a plurality of antenna elements for the purpose of a higher-speed, higher-quality signal and a larger subscriber capacity. One of such methods is a multi-beam method of selecting a transmission/reception beam from a plurality of fixed directional patterns (multi beams).

As disclosed in, e.g., "Multi-Beam Antenna System for Radio Base Station" (Japanese Patent Laid-Open No. 11-266228), a multi-beam antenna transmitter/receiver of this type selects and receives a reception beam having a delay path excellent in reception quality from a plurality of fixed reception beams in reception. In transmission, the multi-beam antenna transmitter/receiver selects and transmits a transmission beam in the same direction as that of a path delay/reception beam number pair excellent in reception quality from path delay/reception beam number pairs selected upon reception.

Figure 7:
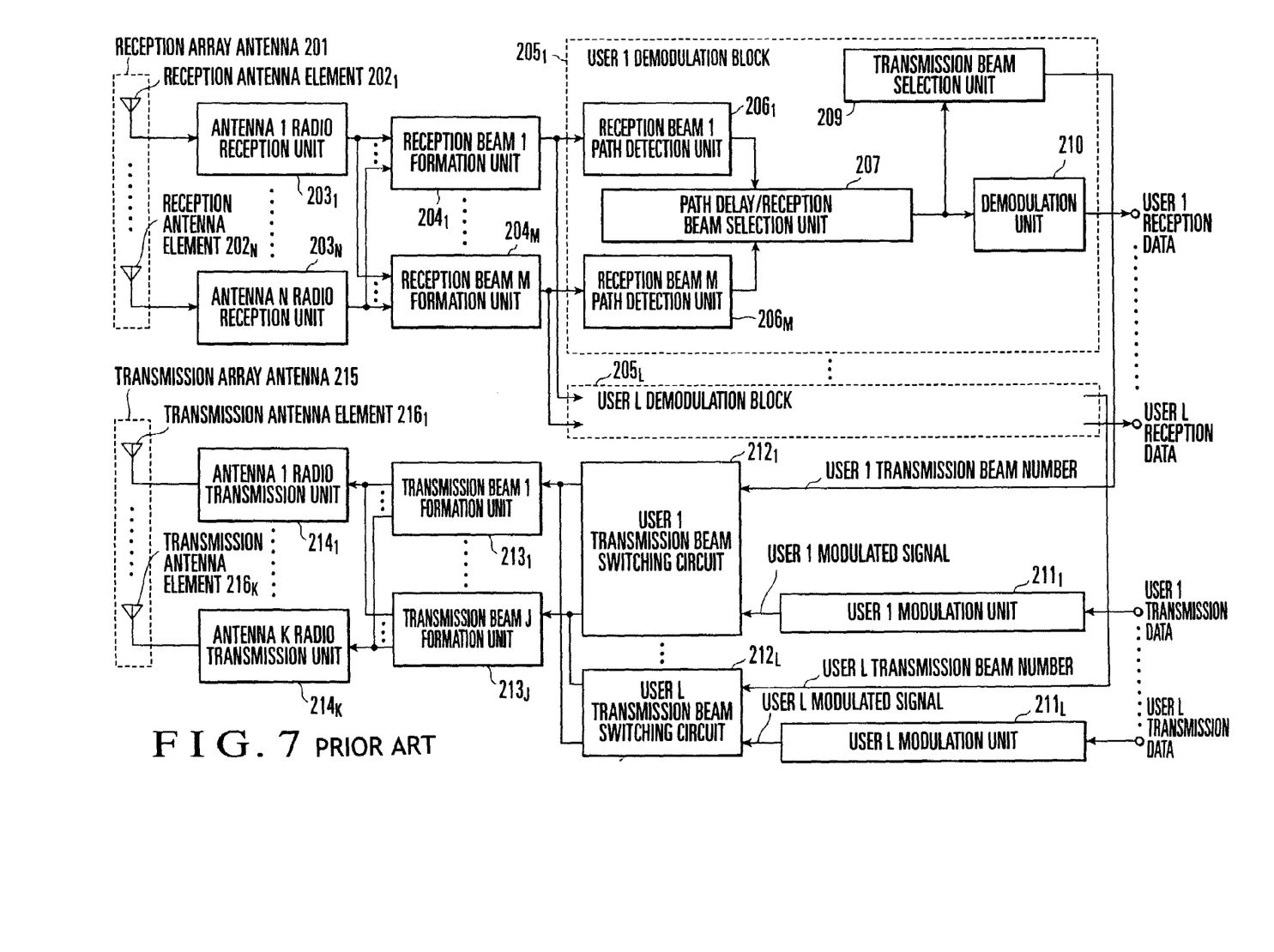
FIG. 7 is a block diagram showing an example of a conventional multi-beam antenna transmitter/receiver.

FIG. 7 is a block diagram showing an example of a conventional multi-beam antenna transmitter/receiver. The conventional multi-beam antenna transmitter/receiver comprises a reception array antenna 201, an antenna 1 radio reception unit $203_1$ to antenna N radio reception unit $203_N$ corresponding to reception antenna elements $202_1$ to $202_N$, a reception beam 1 formation unit $204_1$ to reception beam M formation unit $204_M$ (to be also referred to as reception beam formation units 204), a user 1 demodulation block $205_1$ to user L demodulation block $205_L$ (to be also referred to as user demodulation blocks 205), a user 1 modulation unit $211_1$ to user L modulation unit $211_L$, a user 1 transmission beam switching circuit $212_1$ to user L transmission beam switching circuit $212_L$, a transmission beam 1 formation unit $213_1$ to transmission beam J formation unit $213_J$, an antenna 1 radio transmission unit $214_1$ to antenna K radio transmission unit $214_K$ corresponding to transmission antenna elements $216_1$ to $216_K$, and a transmission array antenna 215.

The reception array antenna 201 is formed from the N reception antenna elements $202_1$ to $202_N$. Each of the reception antenna elements $202_1$ to $202_N$ is free from any limitation on the horizontal and vertical directivities, and has, for example, omnidirectivity or dipole. The N reception antenna elements $202_1$ to $202_N$ are arranged close to each other so as to correlate the reception signals of the antenna elements with each other. The reception array antenna 201 is not limited in the number of reception antenna elements and their layout as far as the N reception antenna elements $202_1$ to $202_N$ are arranged close to each other. An example of the layout is a circular layout or linear layout at the half-wavelength interval of the carrier.

Signals received by the N reception antenna elements $202_1$ to $202_N$ contain desired user signal components, interference signal components, and thermal noise. Each of the desired user signal component and interference signal component contains multipath components. In general, these signal components (desired user signal component and interference signal component) arrive from different directions. Thus, pairs of path delays and reception beam numbers (path delays/reception beam numbers) of desired user signals exist.

Each of the antenna 1 radio reception unit $203_1$ to antenna N radio reception unit $203_N$ comprises a low-noise amplifier, bandpass filter, mixer, local oscillator, AGC (Auto Gain Controller), quadrature detector, low-pass filter, analog/digital converter, and the like. The antenna 1 radio reception unit $203_1$ will be taken as an example. The antenna 1 radio reception unit $203_1$ receives an output from the reception antenna element $202_1$, performs reception processes such as amplification of an input signal, frequency conversion from the radio band to the baseband, quadrature detection, and analog/digital conversion, and outputs the resultant signal to the reception beam 1 formation unit $204_1$ to reception beam M formation unit $204_M$.

The reception beam 1 formation unit $204_1$ to reception beam M formation unit $204_M$ receive outputs from the antenna 1 radio reception unit $203_1$ to antenna N radio reception unit $203_N$, form fixed reception beams different between the respective reception beam formation units for the input signals, and output the beams to the user 1 demodulation block $205_1$ to user L demodulation block $205_L$. The number of fixed reception beams, the shape of the fixed reception beam, and the fixed reception beam formation method are not specifically limited. An example of the shape of the fixed reception beam is a quadrature multi-beam, and an example of the fixed reception beam formation method is a method of multiplying input signals by a fixed complex beam weight by digital calculation and calculating the sum.(digital beam forming). In FIG. 7, the reception beam 1 formation unit $204_1$ to reception beam M formation unit $204_M$ are arranged on the output side of the antenna 1 radio reception unit $203_1$ to antenna N radio reception unit $203_N$, and form beams for digital signals of the baseband. A beam formation method in the radio band such as Butler matrix can also be adopted.

The reception beam 1 formation unit $204_1$ to reception beam M formation unit $204_M$ form fixed reception beams different between the respective reception beam formation units 204 for input signals containing the components of all user signals (user 1 signal to user L signal) and the multipath components of the user signals, and demultiplex the input signals in respective arrival directions.

Each of the user 1 demodulation block $205_1$ to user L demodulation block $205_L$ is formed from a reception beam 1 path detection unit $206_1$ to reception beam M path detection unit $206_M$, a path delay/reception beam selection unit 207, a transmission beam selection unit 209, and a demodulation unit 210.

The user 1 demodulation block $205_1$ to user L demodulation block $205_L$ output user 1 reception data to user L reception data (user reception data) in correspondence with respective users. Since the user demodulation blocks 205 have the same function, the user 1 demodulation block $205_1$ will be exemplified.

The user 1 demodulation block $205_1$ receives outputs from the reception beam 1 formation unit $204_1$ to reception beam M formation unit $204_M$, and outputs a user 1 transmission beam number and user 1 reception data.

The reception beam 1 path detection unit $206_1$ to reception beam M path detection unit $206_M$ receive outputs from the reception beam 1 formation unit $204_1$ to reception beam M formation unit $204_M$, detect the path delays of user signals in the input signals, measure the reception qualities of the user signals at the detected path delays, and output reception quality information to the path delay/reception beam selection unit 207. Input signals and the user 1 signal to user L signal are multiplexed, and the multipath components of the user signals by propagation delays are also multiplexed.

The reception beam 1 path detection unit $206_1$ to reception beam M path detection unit $206_M$ can also detect paths and measure the reception qualities of user signals at the detected path delays by using only a known symbol (pilot symbol or the like) of the user signal.

The path delay/reception beam selection unit 207 receives pieces of reception quality information of user signals corresponding to path delays/reception beam numbers as outputs from the reception beam 1 path detection unit $206_1$ to reception beam M path detection unit $206_M$. The path delay/reception beam selection unit 207 selects a path delay/reception beam number pair used for demodulation on the basis of the reception quality of the user signal, and outputs reception quality information of a user signal corresponding to the selected path delay/reception beam number to the transmission beam selection unit 209 and demodulation unit 210.

The transmission beam selection unit 209 receives the reception quality information of the user signal corresponding to the path delay/reception beam number as an output from the path delay/reception beam selection unit 207, and outputs the number of a transmission beam in the same direction as that of a reception beam having the delay path excellent in reception quality to the user 1 transmission beam switching circuit $212_1$.

The number of selected transmission beams is generally smaller than the number of path delay/reception beam number pairs used for demodulation. In many cases, the number of transmission beams is 1 in order to reduce interference with another user by transmission of a plurality of beams.

The demodulation unit 210 receives the reception quality information of the user signal corresponding to the path delay/reception beam number as an output from the path delay/reception beam selection unit 207, performs a demodulation process on the basis of the input path delay/reception beam number, and outputs user 1 reception data.

The user 1 modulation unit $211_1$ to user L modulation unit $211_L$ respectively receive user 1 transmission data to user L transmission data (user transmission data), perform a modulation process, and output the modulated signals to the user 1 transmission beam switching circuit $212_1$ to user L transmission beam switching circuit $212_L$.

The user 1 transmission beam switching circuit $212_1$ to user L transmission beam switching circuit $212_L$ receive the user 1 transmission beam number to user L transmission beam number as outputs from the transmission beam selection units 209 for respective users, and the modulated user signals as outputs from the user 1 modulation unit $211_1$ to user L modulation unit $211_L$. The user 1 transmission beam switching circuit $212_1$ to user L transmission beam switching circuit $212_L$ select transmission beam formation units corresponding to the transmission beam numbers for the users from the transmission beam 1 formation unit $213_1$ to transmission beam J formation unit $213_J$, and output the modulated user signals to the selected transmission beam formation units.

The transmission beam 1 formation unit $213_1$ to transmission beam J formation unit $213_J$ receive outputs from the user 1 transmission beam switching circuit $212_1$ to user L transmission beam switching circuit $212_L$, form fixed transmission beams different between the transmission beam 1 formation unit $213_1$ and transmission beam J formation unit $213_J$ for the input signals, and output the fixed transmission beams to the antenna 1 radio transmission unit $214_1$ to antenna K radio transmission unit $214_K$. The number of fixed transmission beams, the shape of the fixed transmission beam, and the fixed transmission beam formation method are not specifically limited. An example of the shape of the fixed transmission beam is a quadrature multi-beam, and an example of the fixed transmission beam formation method is a method of multiplying input signals by a fixed complex beam weight by digital calculation (digital beam forming). In FIG. 7, the transmission beam 1 formation unit $213_1$ to reception beam J formation unit $213_J$ are arranged on the input side of the antenna 1 radio transmission unit $214_1$ to antenna K radio transmission unit $214_K$, and form beams for digital signals of the baseband. A beam formation method in the radio band such as Butler matrix can also be adopted.

Each of the antenna 1 radio transmission unit $214_1$ to antenna K radio transmission unit $214_K$ comprises an amplifier, bandpass filter, mixer, local oscillator, quadrature modulation, low-pass filter, digital/analog converter, and the like. The antenna 1 radio transmission unit $214_1$ will be exemplified. The antenna 1 radio transmission unit $214_1$ receives outputs from the transmission beam 1 formation unit $213_1$ to transmission beam J formation unit $213_J$, performs reception processes such as digital/analog conversion of an input signal, quadrature modulation, frequency conversion from the baseband to the radio band, and amplification of a signal, and outputs the resultant signal to the transmission antenna element $216_1$.

The transmission array antenna 215 is formed from the K transmission antenna elements $216_1$ to $216_K$. Each of the transmission antenna elements $216_1$ to $216_K$ is free from any limitation on the horizontal and vertical directivities, and has, for example, omnidirectivity or dipole. The K transmission antenna elements $216_1$ to $216_K$ are arranged close to each other so as to correlate the transmission signals of the antenna elements with each other. The transmission array antenna 215 is not limited in the layout as far as the K reception antenna elements $216_1$ to $216_K$ are arranged close to each other. An example of the layout is a circular layout or linear layout at the half-wavelength interval of the carrier.

The K transmission antenna elements $216_1$ to $216_K$ receive and transmit signals in which user signals (user 1 signal to user L signal) by transmission beams as outputs from the antenna 1 radio transmission unit $214_1$ to antenna K radio transmission unit $214_K$ are multiplexed.

The conventional multi-beam transmitter/receiver shown in FIG. 7 selects and receives a reception beam having a delay path excellent in reception quality from a plurality of fixed reception beams in reception. In transmission, the multi-beam transmitter/receiver selects and transmits a transmission beam in the same direction as that of a path delay/reception beam number pair excellent in reception quality from path delay/reception beam number pairs selected upon reception. With this process, the multi-beam transmitter/receiver can form a beam which increases the transmission/reception gain in a desired signal direction and decreases it in another direction.

A problem of the conventional multi-beam antenna transmitter/receiver as shown in FIG. 7 is deterioration of the transmission characteristic. This is because a transmission beam in the same direction as that of a path delay/reception beam number pair excellent in reception quality is selected from path delay/reception beam number pairs selected upon reception, and a transmission beam optimum in the multipath environment cannot be selected. In the multipath environment, the user signal component contains a plurality of multipath components. These signal components generally arrive from different directions, and each reception beam contains a plurality of multipath components.

The conventional multi-beam antenna transmitter/receiver selects a transmission beam in the same direction as that of a path delay/reception beam number pair excellent in reception quality from path delay/reception beam number pairs selected upon reception. When the overall reception qualities of reception beams are compared, a reception beam different from a selected reception beam may exhibit a higher overall reception quality. The overall reception quality is prepared by calculating (e.g., adding) some or all of the reception qualities of multipath components (path delays) contained in a reception beam. An optimum transmission beam is a transmission beam in a direction in which the transmission beam coincides with (is identical to) or is close to a reception beam excellent in overall reception quality. The conventional multi-beam antenna transmitter/receiver cannot select any transmission beam optimum in the multipath environment.

This will be expatiated with reference to numerical values, but the present invention is not limited to these values.

Assume that the path delay/reception beam selection unit 207 selects two upper pairs (pair a and pair b) from the following four path delay/reception beam number pairs.

Reception quality of pair a (path delay a/reception beam 1):10

Reception quality of pair b (path delay b/reception beam 2):8

Reception quality of pair c (path delay c/reception beam 2):5

Reception quality of pair d (path delay d/reception beam 1):1

At this time, if the transmission beam selection unit 209 selects one transmission beam, the conventional multi-beam antenna transmitter/receiver shown in FIG. 7 compares the reception qualities of pairs a and b (10>8), and selects a transmission beam in the same direction as reception beam 1. However, reception beam 2 has a higher overall reception quality obtained by calculating reception qualities for each reception beam (overall reception quality of reception beam 1=10+1< overall reception quality of reception beam 2=8+5). The conventional multi-beam antenna transmitter/receiver cannot select an actually optimum transmission beam.

SUMMARY OF THE INVENTION

It is an object of the present invention to provide a multi-beam antenna transmitter/receiver, transmitting/receiving method, and transmission beam selection method which select an optimum transmission beam even in the multipath environment and attain an excellent transmission characteristic and circuit quality.

To achieve the above object, a multi-beam antenna transmitter/receiver according to the present invention is characterized by having a plurality of reception beams and a plurality of transmission beams, and selecting the transmission beam on the basis of overall reception qualities calculated from reception qualities of path delays of user signals present in the plurality of reception beams.

The reception beam may be selected on the basis of the overall reception quality, and the transmission beam having a direction which coincides with or is close to a direction of the selected reception beam may be selected.

Reception power or an SIR (Signal to Interference Ratio) may be used as an index of the reception quality.

The multi-beam antenna transmitter/receiver may comprise a reception array antenna in which a reception antenna element is arranged, radio reception means for receiving an output from the reception antenna element, performing a reception process for an input signal, and outputting the signal, reception beam formation means for receiving an output from the radio reception means and forming a reception beam, user demodulation means for receiving an output from the reception beam formation means, calculating an overall reception quality for a path delay/reception beam number of a user signal present in the reception beam to output a user transmission beam number, and outputting user reception data using the path delay/reception beam number, user modulation means for receiving user transmission data, performing a modulation process, and outputting a modulated user signal, user transmission beam switching means for receiving the user transmission beam number and the modulated user signal, and outputting the modulated user signal so as to form a transmission beam corresponding to the user transmission beam number, transmission beam formation means for receiving an output from the user transmission beam switching means, and forming the transmission beam, radio transmission means for receiving an output from the transmission beam formation means, performing a transmission process for an input signal, and outputting the signal, and a transmission array antenna in which a transmission antenna element for transmitting an output from the radio transmission means is arranged.

The user demodulation means may comprise reception beam path detection means for detecting a path delay for each user from an output from the reception beam formation means, and outputting the path delay/reception beam number, path delay/reception beam selection means for selecting the path delay/reception beam number used for demodulation on the basis of a reception quality of a user signal corresponding to the path delay/reception beam number as an output from the reception beam path detection means, demodulation means for performing demodulation using the path delay/reception beam number notified by the path delay/reception beam selection means, reception beam calculation means for calculating an overall reception quality of a user signal for each reception beam from the reception quality of the user signal corresponding to the path delay/reception beam number as an output from the reception beam path detection means, and transmission beam selection means for selecting the transmission beam on the basis of the overall reception quality of the user signal for each reception beam that is notified by the reception beam calculation means, and notifying the user transmission beam switching means of the transmission beam.

The reception beam calculation means may use reception power as an index of the reception quality and calculate overall reception power as the overall reception quality when the overall reception quality of the user signal for each reception beam is calculated from the reception quality of the user signal corresponding to the path delay/reception beam number as an output from the reception beam path detection means.

The reception beam calculation means may use SIR as an index of the reception quality and calculate overall SIR as the overall reception quality when the overall reception quality of the user signal for each reception beam is calculated from the reception quality of the user signal corresponding to the path delay/reception beam number as an output from the reception beam path detection means.

The reception beam calculation means may calculate the overall reception quality of the user signal for each reception beam by using a reception quality corresponding to a path delay/reception beam number selected on the basis of a predetermined criterion when the overall reception quality of the user signal is calculated for each reception beam from the reception quality of the user signal corresponding to the path delay/reception beam number as an output from the reception beam path detection means.

The reception beam calculation means may select P (P is an integer of not less than 2) upper path delays/reception beam numbers excellent in reception quality as the path delay/reception beam number selected on the basis of the predetermined criterion.

The reception beam calculation means may select, as the path delay/reception beam number selected on the basis of the predetermined criterion, a maximum of Q (Q is an integer of not less than 2) path delays/reception beam numbers with which the reception quality satisfies a predetermined reception quality criterion.

The reception beam calculation means may use the path delay/reception beam number selected by the path delay/reception beam selection means as the path delay/reception beam number selected on the basis of the predetermined criterion.

The multi-beam antenna transmitter/receiver may comprise means for forming the plurality of reception beams, means for forming the plurality of transmission beams, means for calculating the overall reception qualities for the respective reception beams by adding values of the reception qualities for the path delays of the user signals, and means for selecting a reception beam excellent in overall reception quality and selecting a transmission beam having a direction which coincides with or is close to a direction of the selected reception beam.

A multi-beam antenna transmitting/receiving method according to the present invention is characterized by having a plurality of reception beams and a plurality of transmission beams, and selecting the transmission beam on the basis of overall reception qualities calculated from reception qualities of path delays of user signals present in the plurality of reception beams.

The reception beam may be selected on the basis of the overall reception quality, and the transmission beam having a direction which coincides with or is close to a direction of the selected reception beam may be selected.

Reception power or an SIR (Signal to Interference Ratio) may be used as an index of the reception quality.

The multi-beam antenna transmitting/receiving method may comprise the radio reception step of receiving an output from a reception antenna element which forms a reception array antenna, performing a reception process for an input signal, and outputting the signal, the reception beam formation step of receiving an output from the radio reception step and forming a reception beam, the user demodulation step of receiving an output from the reception beam formation step, calculating an overall reception quality for a path delay/reception beam number of a user signal present in the reception beam to output a user transmission beam number, and outputting user reception data using the path delay/reception beam number, the user modulation step of receiving user transmission data, performing a modulation process, and outputting a modulated user signal, the user transmission beam switching step of receiving the user transmission beam number and the modulated user signal, and outputting the modulated user signal so as to form a transmission beam corresponding to the user transmission beam number, the transmission beam formation step of receiving an output from the user transmission beam switching step, and forming the transmission beam, and the radio transmission step of receiving an output from the transmission beam formation step, performing a transmission process for an input signal, and outputting the signal to a transmission antenna element which forms a transmission array antenna.

The user demodulation step may comprise the reception beam path detection step of detecting a path delay for each user from an output from the reception beam formation step, and outputting the path delay/reception beam number, the path delay/reception beam selection step of selecting the path delay/reception beam number used for demodulation on the basis of a reception quality of a user signal corresponding to the path delay/reception beam number as an output from the reception beam path detection step, the demodulation step of performing demodulation using the path delay/reception beam number notified in the path delay/reception beam selection step, the reception beam calculation step of calculating an overall reception quality of a user signal for each reception beam from the reception quality of the user signal corresponding to the path delay/reception beam number as an output from the reception beam path detection step, and the transmission beam selection step of selecting the transmission beam on the basis of the overall reception quality of the user signal for each reception beam that is notified in the reception beam calculation step, and notifying the user transmission beam switching step of the transmission beam.

In the reception beam calculation step, reception power may be used as an index of the reception quality, and overall reception power may be calculated as the overall reception quality when the overall reception quality of the user signal for each reception beam is calculated from the reception quality of the user signal corresponding to the path delay/reception beam number as an output from the reception beam path detection step.

In the reception beam calculation step, SIR may be used as an index of the reception quality, and overall SIR may be calculated as the overall reception quality when the overall reception quality of the user signal for each reception beam is calculated from the reception quality of the user signal corresponding to the path delay/reception beam number as an output from the reception beam path detection step.

In the reception beam calculation step, the overall reception quality of the user signal may be calculated for each reception beam by using a reception quality corresponding to a path delay/reception beam number selected on the basis of a predetermined criterion when the overall reception quality of the user signal is calculated for each reception beam from the reception quality of the user signal corresponding to the path delay/reception beam number as an output from the reception beam path detection step.

In the reception beam calculation step, P (P is an integer of not less than 2) upper path delays/reception beam numbers excellent in reception quality may be selected as the path delay/reception beam number selected on the basis of the predetermined criterion.

In the reception beam calculation step, a maximum of Q (Q is an integer of not less than 2) path delays/reception beam numbers with which the reception quality satisfies a predetermined reception quality criterion may be selected as the path delay/reception beam number selected on the basis of the predetermined criterion.

In the reception beam calculation step, the path delay/reception beam number selected in the path delay/reception beam selection step may be used as the path delay/reception beam number selected on the basis of the predetermined criterion.

The multi-beam antenna transmitting/receiving method may comprise the step of calculating the overall reception qualities for the respective reception beams by adding values of the reception qualities for the path delays of the user signals, and the step of selecting a reception beam excellent in overall reception quality and selecting a transmission beam having a direction which coincides with or is close to a direction of the selected reception beam.

A transmission beam selection method according to the present invention is characterized by selecting a transmission beam on the basis of overall reception qualities calculated from reception qualities of path delays of user signals present in reception beams.

The reception beam may be selected on the basis of the overall reception quality, and the transmission beam having a direction which coincides with or is close to a direction of the selected reception beam may be selected.

A base station according to the present invention is characterized by comprising the above-described multi-beam antenna transmitter/receiver. A mobile station according to the present invention is characterized by comprising the above-described multi-beam antenna transmitter/receiver.

DETAILED DESCRIPTION OF THE EMBODIMENT

An embodiment of the present invention will be described in detail with reference to the accompanying drawings. In the following description, the number of users is L (L is an integer of 1 or more), the number of reception antenna elements is N (N is an integer of 1 or more), the number of reception beams is M (M is an integer of 1 or more), the number of transmission beams is J (J is an integer of 1 or more), and the number of transmission antenna elements is K (K is an integer of 1 or more). Hence, users are user 1 to user L, and L user signals are a user 1 signal to user L signal. Reception beams are reception beam 1 to reception beam M, and transmission beams are transmission beam 1 to transmission beam J. A multi-beam antenna transmitter/receiver having these settings will be explained.

Figure 1:
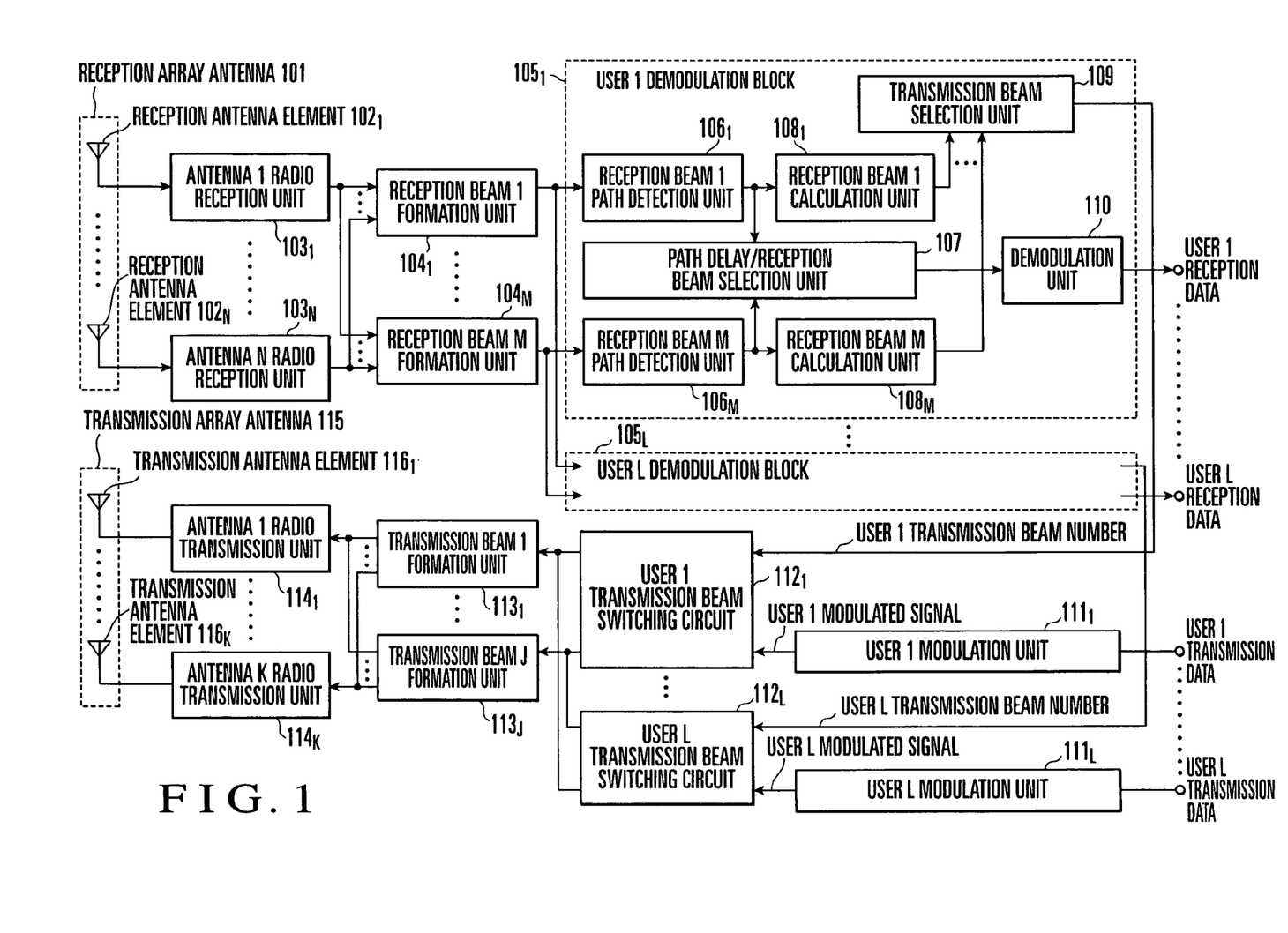
FIG. 1 is a block diagram showing an embodiment of a multi-beam antenna transmitter/receiver according to the present invention.

Referring to FIG. 1, the multi-beam antenna transmitter/receiver according to the present invention comprises a reception array antenna 101, reception antenna elements $102_1$ to $102_N$ which form the reception array antenna 101, an antenna 1 radio reception unit $103_1$ to antenna N radio reception unit $103_N$ (to be also referred to radio reception units 103) corresponding to the reception antenna elements $102_1$ to $102_N$, a reception beam 1 formation unit $104_1$ to reception beam M formation unit $104_M$ (to be also referred to as reception beam formation units 104), a user 1 demodulation block $105_1$ to user L demodulation block $105_L$ (to be also referred to as user demodulation blocks 105), a user 1 modulation unit $111_1$ to user L modulation unit $111_L$ (to be also referred to as user modulation units 111), a user 1 transmission beam switching circuit $112_1$ to user L transmission beam switching circuit $112_L$ (to be also referred to as user transmission beam switching circuits 112), a transmission beam 1 formation unit $113_1$ to transmission beam J formation unit $113_J$ (to be also referred to as transmission beam formation units 113), an antenna 1 radio transmission unit $114_1$ to antenna K radio transmission unit $114_K$ (to be also referred to as radio transmission units 114) corresponding to transmission antenna elements $116_1$ to $116_K$, the transmission antenna elements $116_1$ to $116_K$ corresponding to the radio transmission units 114, and a transmission array antenna 115 formed from the transmission antenna elements $116_1$ to $116_K$.

Each of the reception antenna elements $102_1$ to $102_N$ is free from any limitation on the horizontal and vertical directivities, and has, for example, omnidirectivity or dipole. The N reception antenna elements $102_1$ to $102_N$ are arranged close to each other so as to correlate reception signals with each other. The reception array antenna 101 is not limited in the number of reception antenna elements $102_1$ to $102_N$ and their layout as far as the reception antenna elements $102_1$ to $102_N$ are arranged close to each other. An example of the layout is a circular layout or linear layout at the half-wavelength interval of the carrier.

Signals received by the reception antenna elements $102_1$ to $102_N$ contain desired user signal components, interference signal components, and thermal noise. Each of the desired user signal component and interference signal component contains multipath components. In general, these signal components (desired user signal component and interference signal component containing multipath components) arrive from different directions. Thus, path delay/reception beam number pairs of desired user signals exist.

Each of the antenna 1 radio reception unit $103_1$ to antenna N radio reception unit $103_N$ comprises a low-noise amplifier, bandpass filter, mixer, local oscillator, AGC (Auto Gain Controller), quadrature detector, low-pass filter, analog/digital converter, and the like. The antenna 1 radio reception unit $103_1$ will be taken as an example. The antenna 1 radio reception unit $103_1$ receives an output from the reception antenna element $102_1$, performs reception processes such as amplification of an input signal, frequency conversion from the radio band to the baseband, quadrature detection, and analog/digital conversion, and outputs the resultant signal to the reception beam 1 formation unit $104_1$ to reception beam M formation unit $104_M$.

The reception beam 1 formation unit $104_1$ to reception beam M formation unit $104_M$ receive outputs from the antenna 1 radio reception unit $103_1$ to antenna N radio reception unit $103_N$, form fixed reception beams different between the respective reception beam formation units 104 for the input signals, and output the beams to the user 1 demodulation block $105_1$ to user L demodulation block $105_L$. The number of fixed reception beams, the shape of the fixed reception beam, and the fixed reception beam formation method are not specifically limited. An example of the shape of the fixed reception beam is a quadrature multibeam, and an example of the fixed reception beam formation method is a method of multiplying input signals by a fixed complex beam weight by digital calculation and calculating the sum (digital beam forming). In FIG. 1, the reception beam 1 formation unit $104_1$ to reception beam M formation unit $104_M$ are arranged on the output side of the antenna 1 radio reception unit $103_1$ to antenna N radio reception unit $103_N$, and form beams for digital signals of the baseband. A beam formation method in the radio band such as Butler matrix can also be adopted.

The reception beam 1 formation unit $104_1$ to reception beam M formation unit $104_M$ form fixed reception beams different between the respective reception beam formation units 104 for input signals containing the components of all user signals (user 1 signal to user L signal) and the multipath components of the user signals, and demultiplex the input signals in respective arrival directions.

Each of the user 1 demodulation block $105_1$ to user L demodulation block $105_L$ is formed from a reception beam 1 path detection unit $106_1$ to reception beam M path detection unit $106_M$ (to be also referred to as reception beam path detection units 106), a path delay/reception beam selection unit 107, a reception beam 1 calculation unit $108_1$ to reception beam M calculation unit $108_M$ (to be also referred to as reception beam calculation units 108), a transmission beam selection unit 109, and a demodulation unit 110. The user 1 demodulation block $105_1$ to user L demodulation block $105_L$ output a user 1 transmission beam number to user L transmission beam number (user transmission beam numbers), and user 1 reception data to user L reception data (user reception data).

Of the user 1 demodulation block $105_1$ to user L demodulation block $105_L$, the user 1 demodulation block $105_1$ will be exemplified.

The user 1 demodulation block $105_1$ receives outputs from the reception beam 1 formation unit $104_1$ to reception beam M formation unit $104_M$ and outputs a user 1 transmission beam number and user 1 reception data.

The reception beam 1 path detection unit $106_1$ to reception beam M path detection unit $106_M$ receive outputs from the reception beam 1 formation unit $104_1$ to reception beam M formation unit $104_M$, detect the path delays of user signals in the input signals, measure the reception qualities of the user signals at the detected path delays, and output path delays, reception beam numbers, and the like to the path delay/reception beam selection unit 107 and the reception beam 1 calculation unit $108_1$ to reception beam M calculation unit $108_M$. Input signals and the user 1 signal to user L signal are multiplexed, and the multipath components of the user signals by propagation delays are also multiplexed. The user signal multiplexing method is not limited, and is, for example, TDMA (Time Division Multiple Access) or CDMA (Code Division Multiple Access). A method of demultiplexing a plurality of multiplexed user signals, a method of detecting the path delay of a multipath component, and the number of detected path delays are not limited. Further, the index of the reception quality to be measured and the measurement method are not limited. Examples of the reception quality index are reception power (including reception level, reception field strength, and the like), and SIR (Signal to Interference Radio). In addition to SIR, indices expressed by SINR (Signal to Intereference-plus-Noisepower Ratio), SNR (Signal to Noise Ratio), and the like are also available.

The reception beam 1 path detection unit $106_1$ to reception beam M path detection unit $106_M$ can also detect paths and measure the reception qualities of user signals at the path delays of the detected paths by using only a known symbol (pilot symbol or the like) of the user signal.

The path delay/reception beam selection unit 107 receives pieces of reception quality information of user signals corresponding to path delays/reception beam numbers as outputs from the reception beam 1 path detection unit $106_1$ to reception beam M path detection unit $106_M$. The path delay/reception beam selection unit 107 selects a path delay/reception beam number pair used for demodulation on the basis of the reception quality of the user signal, and outputs the selected path delay/reception beam number pair to the demodulation unit 110.

A method of selecting a path delay/reception beam number pair used for demodulation is not specifically limited. For example, A (A is an integer of 2 or more) upper pairs excellent in reception quality may be selected, or a maximum of B (B is an integer of 2 or more) pairs which satisfy a predetermined reception quality criterion may be selected.

The reception beam 1 calculation unit $108_1$ to reception beam M calculation unit $108_M$ receive pieces of reception quality information of user signals corresponding to path delays/reception beam numbers which correspond to reception beams and serve as outputs from the reception beam 1 path detection unit $106_1$ to reception beam M path detection unit $106_M$. The reception beam 1 calculation unit $108_1$ to reception beam M calculation unit $108_M$ calculate the overall reception qualities of the user signals for the respective reception beams, and output the reception beam numbers and pieces of overall reception quality information of the user signals for the respective reception beams to the transmission beam selection unit 109. The overall reception quality is prepared by calculating (e.g., adding) some or all of the reception qualities of multipath components (path delays) contained in a reception beam.

The index of the overall reception quality of a user signal that is calculated for each reception beam may be the reception power of a user signal corresponding to a path delay/reception beam number notified for each reception beam.

The index of the overall reception quality of a user signal that is calculated for each reception beam may be the SIR of a user signal corresponding to a path delay/reception beam number notified for each reception beam.

The present invention also incorporates a method of calculating the overall reception quality of a user signal for each reception beam by using only the reception quality of a user signal corresponding to a path delay/reception beam number selected on the basis of a predetermined criterion in order to simplify calculation in calculating the overall reception quality of a user signal for each reception beam in the reception beam 1 calculation unit $108_1$ to reception beam M calculation unit $108_M$.

As the path delay/reception beam number selected on the basis of a predetermined criterion, P (P is an integer of 2 or more) upper path delays/reception beam numbers excellent in the reception quality of the user signal may be used.

As the path delay/reception beam number selected on the basis of a predetermined criterion, a maximum of Q (Q is an integer of 2 or more) path delays/reception beam numbers with which the reception quality of the user signal satisfies a predetermined reception quality criterion may be used.

As the path delay/reception beam number selected on the basis of a predetermined criterion, a path delay/reception beam number selected by the path delay/reception beam selection unit 107 may be used.

As outputs from the reception beam 1 calculation unit $108_1$ to reception beam M calculation unit $108_M$, the transmission beam selection unit 109 receives reception beam numbers and pieces of overall reception quality information of user signals in the reception beams. The transmission beam selection unit 109 outputs to the user 1 transmission beam switching circuit $112_1$ a user 1 transmission beam number to user L transmission beam number having a direction in which the transmission beam number coincides with or is close to a reception beam number excellent in overall reception quality.

The demodulation unit 110 receives reception quality information of a user signal corresponding to the path delay/reception beam number as an output from the path delay/reception beam selection unit 107, performs a demodulation process on the basis of the input path delay/reception beam number, and outputs user 1 reception data.

The user 1 modulation unit $111_1$ to user L modulation unit $111_L$ respectively receive user 1 transmission data to user L transmission data (user transmission data), perform a modulation process, and output a user 1 modulated signal to user L modulated signal (modulated user signals) to the user 1 transmission beam switching circuit $112_1$ to user L transmission beam switching circuit $112_L$.

The user 1 transmission beam switching circuit $112_1$ to user L transmission beam switching circuit $112_L$ receive the user 1 transmission beam number to user L transmission beam number as outputs from the transmission beam selection units 109 for respective users (user 1 to user L), and the user 1 modulated signal to user L modulated signal as outputs from the user 1 modulation unit $111_1$ to user L modulation unit $111_L$. The user 1 transmission beam switching circuit $112_1$ to user L transmission beam switching circuit $112_L$ select transmission beam formation units 113 corresponding to the user transmission beam numbers for the users from the transmission beam 1 formation unit $113_1$ to transmission beam J formation unit $113_J$, and output the modulated user signals to the selected transmission beam formation units 113.

The transmission beam 1 formation unit $113_1$ to transmission beam J formation unit $113_J$ receive outputs from the user 1 transmission beam switching circuit $112_1$ to user L transmission beam switching circuit $112_L$, form fixed transmission beams different between the transmission beam 1 formation unit $113_1$ to transmission beam J formation unit $113_J$ for the input signals, and output the fixed transmission beams to the antenna 1 radio transmission unit $114_1$ to antenna K radio transmission unit $114_K$.

The number of fixed transmission beams, the shape of the fixed transmission beam, and the fixed transmission beam formation method are not specifically limited. An example of the shape of the fixed transmission beam is a quadrature multi-beam, and an example of the fixed transmission beam formation method is a method of multiplying input signals by a fixed complex beam weight by digital calculation (digital beam forming). In FIG. 1, the transmission beam 1 formation unit $113_1$ to reception beam J formation unit $113_J$ are arranged on the input side of the antenna 1 radio transmission unit $114_1$ to antenna K radio transmission unit $114_K$, and form beams for digital signals of the baseband. A beam formation method in the radio band such as Butler matrix can also be adopted.

Each of the antenna 1 radio transmission unit $114_1$ to antenna K radio transmission unit $114_K$ comprises an amplifier, bandpass filter, mixer, local oscillator, quadrature modulation, low-pass filter, digital/analog converter, and the like. The antenna 1 radio transmission unit $114_1$ will be exemplified. The antenna 1 radio transmission unit $114_1$ receives outputs from the transmission beam 1 formation unit $113_1$ to transmission beam J formation unit $113_J$, performs transmission processes such as digital/analog conversion of an input signal, quadrature modulation, frequency conversion from the baseband to the radio band, and amplification of a signal, and outputs the resultant signal to the transmission antenna element $116_1$.

The transmission array antenna 115 is formed from the K transmission antenna elements $116_1$ to $116_K$. Each of the transmission antenna elements $116_1$ to $116_K$ is free from any limitation on the horizontal and vertical directivities, and has, for example, omnidirectivity or dipole. The transmission antenna elements $116_1$ to $116_K$ are arranged close to each other so as to correlate transmission signals with each other. The transmission array antenna 115 is not limited in the layout as far as the transmission antenna elements $116_1$ to $116_K$ are arranged close to each other. An example of the layout is a circular layout or linear layout at the half-wavelength interval of the carrier.

The transmission antenna elements $116_1$ to $116_K$ receive and transmit signals in which user signals by transmission beams as outputs from the antenna 1 radio transmission unit $114_1$ to antenna K radio transmission unit $114_K$ are multiplexed.

Selection of a reception beam number and selection of a transmission beam number will be explained in detail with reference to FIGS. 2, 3 and 4.

Figure 2:
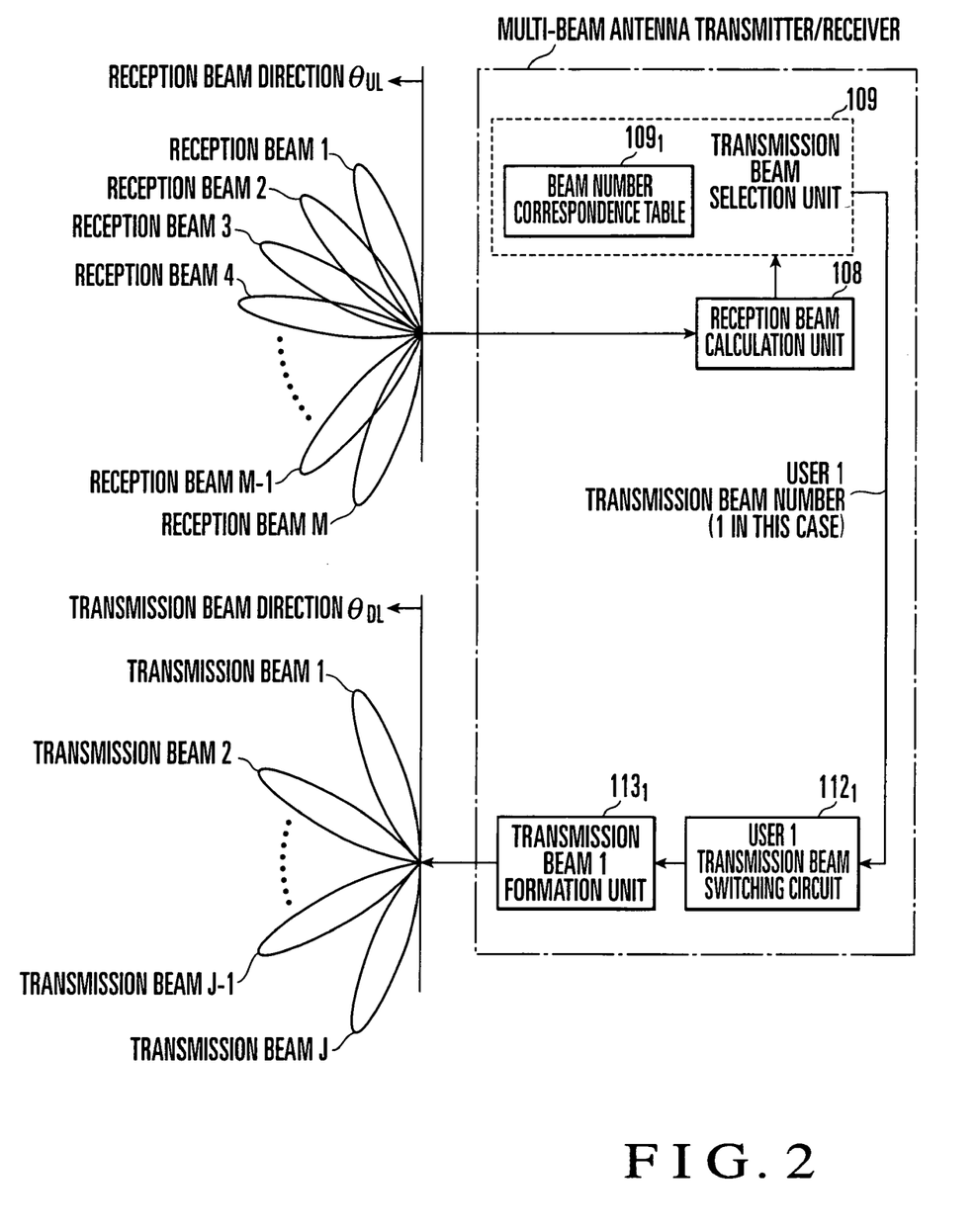
FIG. 2 is a view for explaining selection of a transmission beam.

FIG. 2 is a view for explaining selection of a transmission beam, and mainly illustrates building components necessary for the description. FIG. 3 is a reception quality table, and FIG. 4 is a beam number correspondence table. Transmission beam selection operation for user number 1 and reception beam numbers 1 and 2 will be described in detail. Although FIG. 2 shows reception beam 1 to reception beam M (reception beams), only reception beam 1 and reception beam 2 will be explained.

Figure 3:
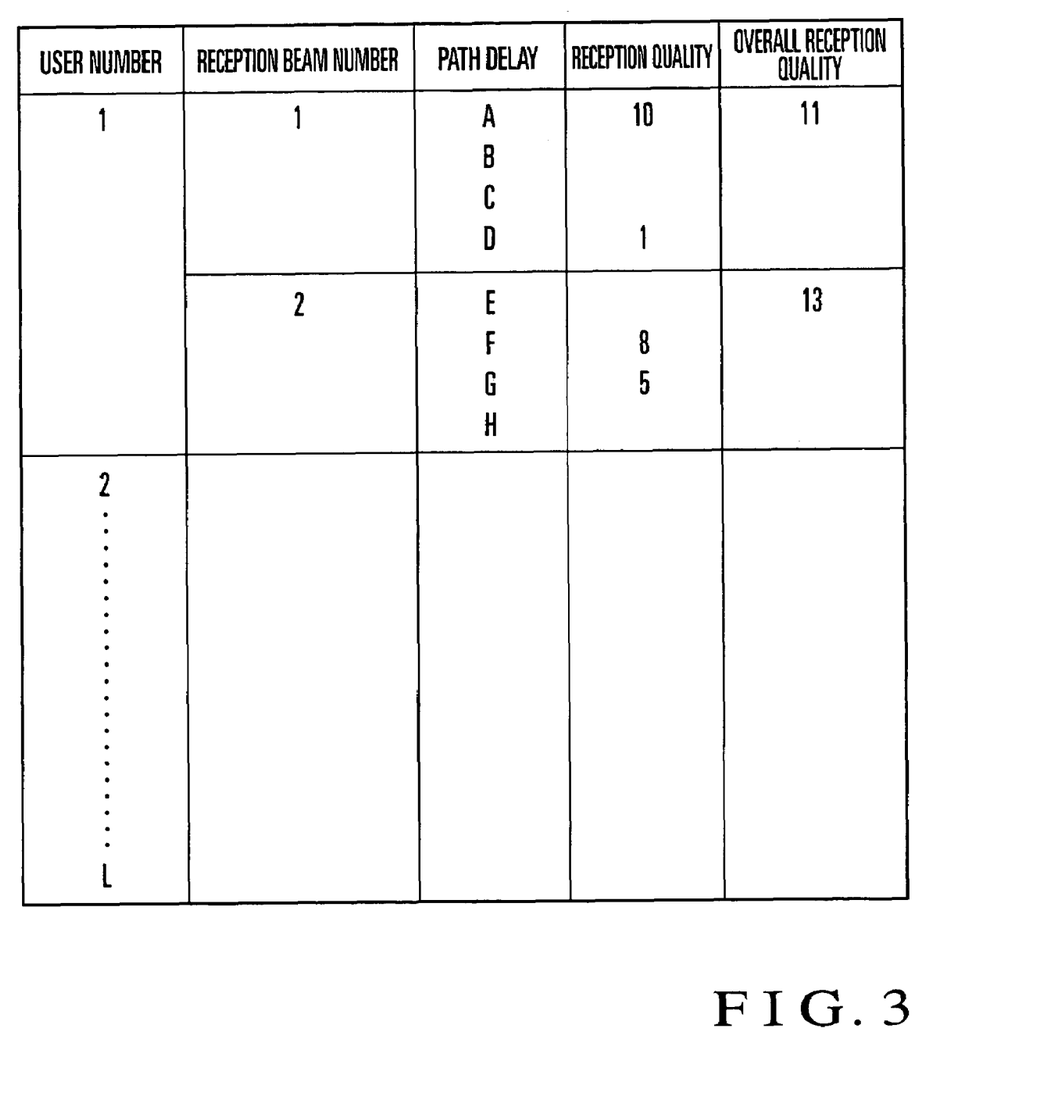
FIG. 3 is a reception quality table.
Figure 4:
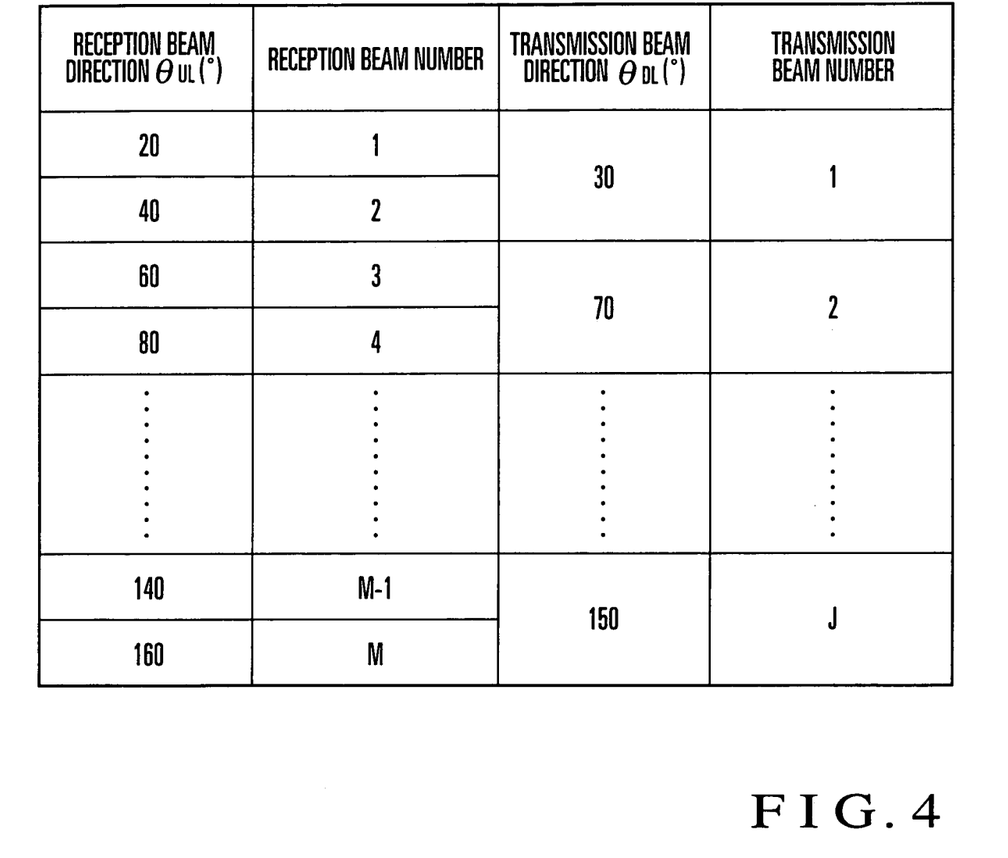
FIG. 4 is a beam number correspondence table.

The reception beam calculation unit 108 calculates (e.g., adds) overall reception qualities from the reception qualities of user 1 signals for reception beam 1 and reception beam 2, as shown in FIG. 3. The reception beam calculation unit 108 outputs the reception beam numbers and the pieces of overall reception quality information of the user 1 signals for the respective reception beams to the transmission beam selection unit 109. Since a reception beam excellent in overall reception quality is reception beam 2, the transmission beam selection unit 109 selects "2" as the reception beam number. By referring to a beam number correspondence table $109_1$, the transmission beam selection unit 109 selects "1" as a corresponding transmission beam number in a direction in which the transmission beam coincides with or is close to reception beam 2. The transmission beam selection unit 109 outputs the transmission beam number "1" to the user 1 transmission beam switching circuit $112_1$. The user 1 transmission beam switching circuit $112_1$ switches to the transmission beam 1 formation unit $113_1$ which forms transmission beam 1, and user 1 transmission data of user 1 is transmitted with the formed transmission beam 1.

The multi-beam antenna transmitter/receiver of the present invention can be employed in a base station and mobile station which form a mobile communication system.

Figure 5:
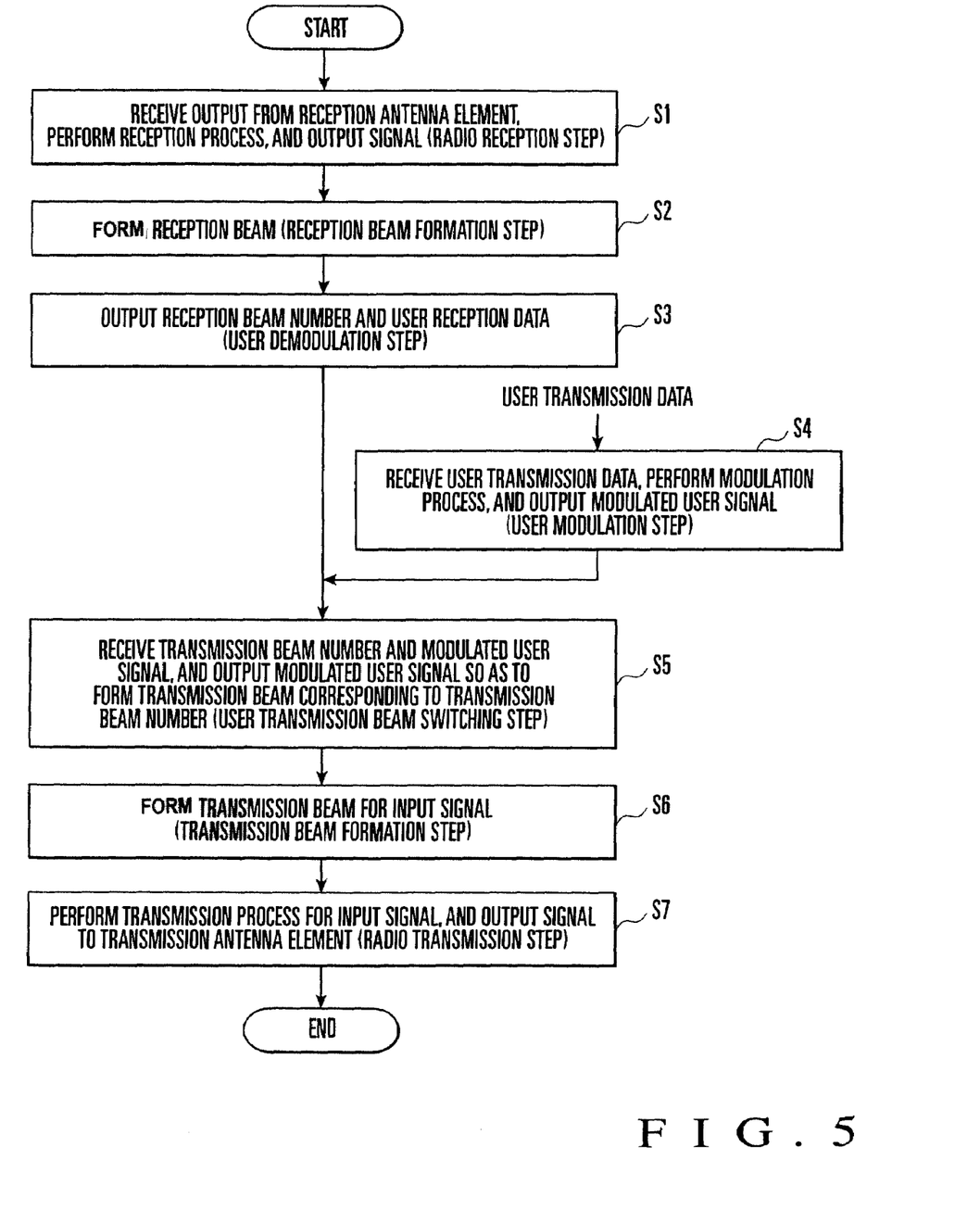
FIG. 5 is a flowchart showing a multi-beam antenna transmitting/receiving method according to the present invention.
Figure 6:
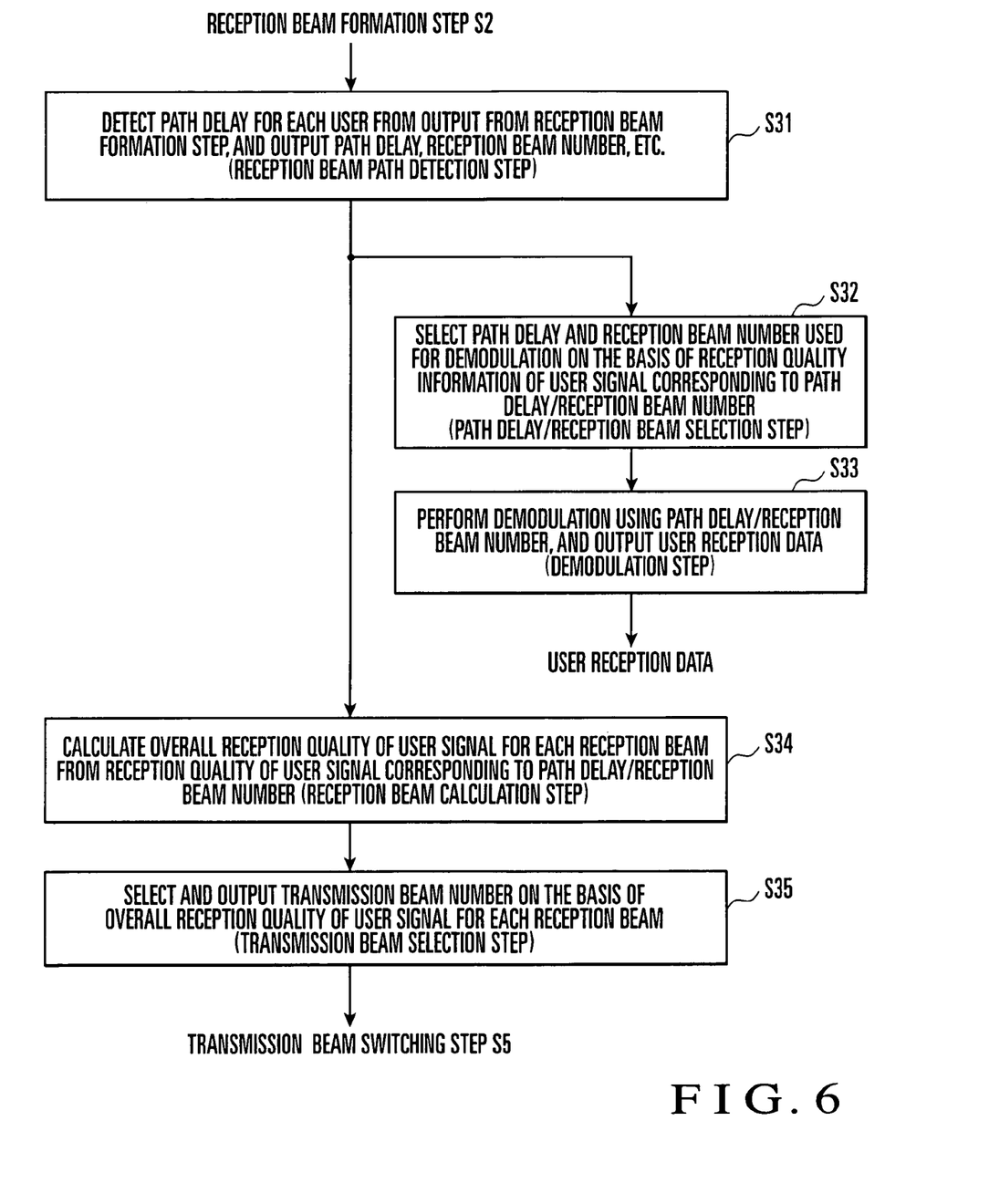
FIG. 6 is a flowchart showing the user demodulation step of the multi-beam antenna transmitting/receiving method according to the present invention.

FIG. 5 is a flowchart showing a multi-beam antenna transmitting/receiving method according to the present invention. FIG. 6 is a flowchart showing the user demodulation step of the multi-beam antenna transmitting/receiving method according to the present invention. The multi-beam antenna transmitting/receiving method will be explained with reference to FIGS. 1, 5, and 6.

Outputs from the reception antenna elements $102_1$ to $102_N$ which form the reception array antenna 101 are received, and reception processes such as amplification of an input signal, frequency conversion, quadrature detection, and analog/digital conversion are performed to output the resultant signals (radio reception step S1). Radio reception step S1 is executed by the antenna 1 radio reception unit $103_1$ to antenna N radio reception unit $103_N$.

Outputs from radio reception step S1 are received to form reception beams (reception beam formation step S2). Reception beam formation step S2 is executed by the reception beam 1 formation unit $104_1$ to reception beam M formation unit $104_M$.

Outputs from reception beam formation step S2 are received, and overall reception qualities corresponding to the path delays/reception beam numbers of user signals present in the reception beams are calculated to output user transmission beam numbers. User reception data are output using the path delays/reception beam numbers (user demodulation step S3). User demodulation step S3 is executed by the user 1 demodulation block $105_1$ to user L demodulation block $105_L$.

User transmission data are received, and a modulation process is performed to output modulated user signals (user modulation step S4). User modulation step S4 is executed by the user modulation units $111_1$ to $111_L$.

The user transmission beam numbers and modulated user signals are received, and the modulated user signals are so output as to form transmission beams corresponding to the user transmission beam numbers (user transmission beam switching step S5). User transmission beam switching step S5 is executed by the user 1 transmission beam switching circuit $112_1$ to user L transmission beam switching circuit $112_L$.

Outputs from user transmission beam switching step S5 are received to form transmission beams (transmission beam formation step S6). Transmission beam formation step S6 is executed by the transmission beam 1 formation unit $113_1$ to transmission beam J formation unit $113_J$.

Outputs from transmission beam formation step S6 are received, and transmission processes such as digital/analog conversion of an input signal, quadrature modulation, frequency conversion, and amplification are performed to output the resultant signals to the transmission antenna elements (radio transmission step S7). Radio transmission step S7 is executed by the antenna 1 radio transmission unit $114_1$ to antenna K radio transmission unit $114_K$ and the transmission array antenna 115.

In user demodulation step S3, path delays for respective users are detected from outputs from reception beam formation step S2, and path delays, reception beam numbers, and the like are output (reception beam path detection step S31). Reception beam path detection step S31 is executed by the reception beam 1 path detection unit $106_1$ to reception beam M path detection unit $106_M$.

A path delay/reception beam number used for demodulation is selected on the basis of pieces of reception quality information of user signals corresponding to the path delays/reception beam numbers as outputs in reception beam path detection step S31 (path delay/reception beam selection step S32). Path delay/reception beam selection step S32 is executed by the path delay/reception beam selection unit 107.

Demodulation is done using the path delay/reception beam number notified in path delay/reception beam selection step S32 (demodulation step S33). Demodulation step S33 is performed by the demodulation unit 110.

The overall reception qualities of user signals for respective reception beams are calculated from pieces of reception quality information of the user signals corresponding to the path delays/reception beam numbers as outputs in reception beam path detection step S31 (reception beam calculation step S34). Reception beam calculation step S34 is executed by the reception beam 1 calculation unit $108_1$ to reception beam M calculation unit $108_M$.

A transmission beam is selected on the basis of the pieces of overall reception quality information of the user signals for respective reception beams that are notified in reception beam calculation step S34, and user transmission beam switching step S5 is notified of the selected transmission beam (transmission beam selection step S35). Transmission beam selection step S35 is executed by the transmission beam selection unit 109.

In reception beam calculation step S34, reception power is utilized as the index of the reception quality, and overall reception power is calculated as the overall reception quality when the overall reception qualities of user signals for respective reception beams are calculated from pieces of reception quality information of user signals corresponding to the path delays/reception beam numbers as outputs in reception beam path detection step S31.

Further, in reception beam calculation step S34, SIR is utilized as the index of the reception quality, and the overall SIR is calculated as the overall reception quality when the overall reception qualities of user signals for respective reception beams are calculated from pieces of reception quality information of user signals corresponding to the path delays/reception beam numbers as outputs in reception beam path detection step S31.

Moreover, in reception beam calculation step S34, the overall reception qualities of user signals are calculated for respective reception beams using only the reception qualities of user signals corresponding to path delays/reception beam numbers selected on the basis of a predetermined criterion when the overall reception qualities of user signals are calculated for respective reception beams from pieces of reception quality information of user signals corresponding to the path delays/reception beam numbers as outputs in reception beam path detection step S31.

In reception beam calculation step S34, P (P is an integer of 2 or more) upper path delays/reception beam numbers excellent in the reception quality of the user signal are selected from path delays/reception beam numbers selected on the basis of a predetermined criterion.

In reception beam calculation step S34, a maximum of Q (Q is an integer of 2 or more) path delays/reception beam numbers with which the reception quality of the user signal satisfies a predetermined reception quality criterion are selected from path delays/reception beam numbers selected on the basis of a predetermined criterion.

In reception beam calculation step S34, path delays/reception beam numbers selected by the path delay/reception beam selection unit are used as path delays/reception beam numbers selected on the basis of a predetermined criterion.

The effects of the above-described embodiment will be described. The present invention can select an optimum transmission beam even in the multipath environment because the overall reception qualities of user signals (user 1 signal to user L signal) for respective reception beams (reception beam 1 to reception beam M) are calculated, and a transmission beam in the same direction as that of a reception beam excellent in overall reception quality or in a close direction is selected. Hence, a good transmission characteristic and a high uplink and/or downlink channel quality can be achieved.

The invention claimed is:

1. A multi-beam antenna transmitter/receiver receiving a plurality of reception beams and transmitting a plurality of transmission beams, and selecting a transmission beam on the basis of overall reception qualities calculated from reception qualities of path delays of user signals present in the plurality of reception beams, the multi-beam antenna transmitter/receiver comprising:
    a reception array antenna in which reception antenna elements are arranged;
    radio reception means for receiving outputs from the reception antenna elements, performing a reception process for an input signal, and outputting the signal;
    reception beam formation means for receiving an output from said radio reception means and forming a reception beam;
    reception beam path detection means for detecting a path delay for each user signal from an output of the reception beam formation means;
    reception beam calculation means for calculating an overall reception quality for a path delay/reception beam number of a user signal present in the reception beam to output a user transmission beam number, and outputting user reception data using the path delay/reception beam number;
    path delay/reception beam selection means for selecting the path delay/reception beam number used for demodulation on the basis of a reception quality of a user signal corresponding to the path delay/reception beam number as an output from said reception beam path detection means;
    demodulation means for performing demodulation using the path delay/reception beam number notified by said path delay/reception beam selection means;
    user modulation means for receiving user transmission data, performing a modulation process, and outputting a modulated user signal;
    user transmission beam switching means for receiving the user transmission beam number and the modulated user signal, and outputting the modulated user signal so as to form a transmission beam corresponding to the user transmission beam number;
    transmission beam selection means for selecting a transmission beam on the basis of overall reception quality calculated of the user signal for each reception beam that is notified by the reception beam calculation means, and notifying the user transmission beam switching means;
    transmission beam formation means for receiving an output from said user transmission beam switching means, and forming the transmission beam;
    radio transmission means for receiving an output from said transmission beam formation means, performing a transmission process for an input signal, and outputting the signal; and
    a transmission array antenna in which transmission antenna elements for transmitting an output from said radio transmission means are arranged.

2. The multi-beam antenna transmitter/receiver according to claim 1, wherein said reception beam path detection means selects the reception beam on the basis of the overall reception quality, and said transmission beam selection means selects the transmission beam having a direction which coincides with or is close to a direction of the selected reception beam is selected.

3. The multi-beam antenna transmitter/receiver according to claim 1, wherein said reception beam calculation means uses reception power or an SIR (Signal to Interference Ratio) as an index of the reception quality.

4. The multi-beam antenna transmitter/receiver according to claim 1, wherein said reception beam calculation means uses reception power as an index of the reception quality and calculates overall reception power as the overall reception quality when the overall reception quality of the user signal for each reception beam is calculated from the reception quality of the user signal corresponding to the path delay/reception beam number as an output from said reception beam path detection means.

5. The multi-beam antenna transmitter/receiver according to claim 1, wherein said reception beam calculation means uses SIR as an index of the reception quality and calculates overall SIR as the overall reception quality when the overall reception quality of the user signal for each reception beam is calculated from the reception quality of the user signal corresponding to the path delay/reception beam number as an output from said reception beam path detection means.

6. The multi-beam antenna transmitter/receiver according to claim 1, wherein said reception beam calculation means calculates the overall reception quality of the user signal for each reception beam by using a reception quality corresponding to a path delay/reception beam number selected on the basis of a predetermined criterion when the overall reception quality of the user signal is calculated for each reception beam from the reception quality of the user signal corresponding to the path delay/reception beam number as an output from said reception beam path detection means.

7. The multi-beam antenna transmitter/receiver according to claim 6, wherein said reception beam calculation means selects P (P is an integer of not less than 2) upper path delays/reception beam numbers excellent in reception quality as the path delay/reception beam number selected on the basis of the predetermined criterion.

8. The multi-beam antenna transmitter/receiver according to claim 6, wherein said reception beam calculation means selects, as the path delay/reception beam number selected on the basis of the predetermined criterion, a maximum of Q (Q is an integer of not less than 2) path delays/reception beam numbers with which the reception quality satisfies a predetermined reception quality criterion.

9. The multi-beam antenna transmitter/receiver according to claim 6, wherein said reception beam calculation means uses the path delay/reception beam number selected by said path delay/reception beam selection means as the path delay/reception beam number selected on the basis of the predetermined criterion.

10. A multi-beam antenna transmitting/receiving method comprising the steps of:
    a radio reception step of receiving outputs from reception antenna elements which form a reception array antenna, performing a reception process for input signals, and outputting the signals;
    a reception beam formation step of receiving signals output from the radio reception step and forming a reception beam;

a reception beam path detecting step of detecting a path delay for each user from an output from the reception beam formation step;

a path delay/reception beam selection step of selecting the path delay/reception beam number used for demodulation on the basis of a reception quality of a user signal corresponding to the path delay/reception beam number as an output from the reception beam path detection step;

a demodulation step of performing demodulation using the path delay/reception beam number notified in the path delay/reception beam selection step, a reception beam calculation step of calculating of an overall reception quality of a user signal corresponding to the path delay/reception beam number as an output from the reception beam path detection step, a user modulation step of receiving user transmission data, performing a modulation process, and outputting a modulated user signal, a user transmission beam switching step of receiving the user transmission beam number and the modulated user signal, and outputting the modulated user signal so as to form a transmission beam corresponding to the user beam number, a transmission beam selection step of selecting a transmission beam on the basis of overall reception quality calculated of the user signal for each reception beam that is notified in the reception beam calculation step, and notifying the user transmission beam switching step of the transmission beam, a transmission beam formation step of receiving an output from the user transmission beam switching step, and forming the transmission beam and a radio transmission step of receiving an output from the transmission beam formation step, performing a transmission process for an input signal, and outputting the signal to transmission antenna elements which form a transmission array antenna.

11. The multi-beam antenna transmitting/receiving method according to claim 10, wherein the reception beam is selected on the basis of the overall reception quality, and the transmission beam having a direction which coincides with or is close to a direction of the selected reception beam is selected.

12. The multi-beam antenna transmitting/receiving method according to claim 10, wherein reception power or an SIR (Signal to Interference Ratio) is used as an index of the reception quality.

13. The multi-beam antenna transmitting/receiving method according to claim 10, wherein in the reception beam calculation step, reception power is used as an index of the reception quality, and overall reception power is calculated as the overall reception quality when the overall reception quality of the user signal for each reception beam is calculated from the reception quality of the user signal corresponding to the path delay/reception beam number as an output from the reception beam path detection step.

14. The multi-beam antenna transmitting/receiving method according to claim 10, wherein in the reception beam calculation step, SIR is used as an index of the reception quality, and overall SIR is calculated as the overall reception quality when the overall reception quality of the user signal for each reception beam is calculated from the reception quality of the user signal corresponding to the path delay/reception beam number as an output from the reception beam path detection step.

15. The multi-beam antenna transmitting/receiving method according to claim 10, wherein in the reception beam calculation step, the overall reception quality of the user signal is calculated for each reception beam by using a reception quality corresponding to a path delay/reception beam number selected on the basis of a predetermined criterion when the overall reception quality of the user signal is calculated for each reception beam from the reception quality of the user signal corresponding to the path delay/reception beam number as an output from the reception beam path detection step.

16. The multi-beam antenna transmitting/receiving method according to claim 15, wherein in the reception beam calculation step, P (P is an integer of not less than 2) upper path delays/reception beam numbers excellent in reception quality are selected as the path delay/reception beam number selected on the basis of the predetermined criterion.

17. The multi-beam antenna transmitting/receiving method according to claim 15, wherein in the reception beam calculation step, a maximum of Q (Q is an integer of not less than 2) path delays/reception beam numbers with which the reception quality satisfies a predetermined reception quality criterion are selected as the path delay/reception beam number selected on the basis of the predetermined criterion.

18. The multi-beam antenna transmitting/receiving method according to claim 15, wherein in the reception beam calculation step, the path delay/reception beam number selected in the path delay/reception beam selection step is used as the path delay/reception beam number selected on the basis of the predetermined criterion.

19. A base station comprising a multi-beam antenna transmitter/receiver receiving a plurality of reception beams and transmitting a plurality of transmission beams, the multi-beam antenna transmitter/receiver comprising:

reception beam formation means forming a reception beam from signals received from said plurality of reception beams;

reception beam path detection means for detecting a path delay for each user signal from an output from said reception beam formation means and outputting a path delay/reception beam number;

path delay/reception beam selection means for selecting the path delay/reception beam number used for demodulation on the basis of a reception quality of a user signal corresponding to the path delay/reception beam number as an output from said reception beam path detection means;

reception beam calculation means for calculating an overall reception quality of a user signal for each reception beam from the reception quality of the user signal corresponding to a path delay/reception beam number as an output from the reception beam path detection means;

user transmission beam switching means for receiving the user beam number and a modulated user signal, and outputting the modulated user signal so as to form a transmission beam corresponding to the user transmission beam number;

transmission beam selection means for selecting the transmission beam on the basis of overall reception qualities calculated from reception qualities of path delays of user signals present in the plurality of reception beams as determined by the reception beam calculation means; and transmission beam formation means receiving an output from the transmission beam switching means and forming said plurality of transmission beams.

20. A mobile station comprising a multi-beam antenna transmitter/receiver receiving a plurality of reception beams and transmitting a plurality of transmission beams, the multi-beam antenna transmitter/receiver comprising:

reception beam formation means forming a reception beam from signals received from said plurality of reception beams;

reception beam path detection means for detecting a path delay for each user signal from an output from said reception beam formation means and outputting a path delay/reception beam number;

path delay/reception beam selection means for selecting the path delay/reception beam number used for demodulation on the basis of a reception quality of a user signal corresponding to the path delay/reception beam number as an output from said reception beam path detection means;

reception beam calculation means for calculating an overall reception quality of a user signal for each reception beam from the reception quality of the user signal corresponding to a path delay/reception beam number as an output from the reception beam path detection means;

user transmission beam switching means for receiving the user beam number and a modulated user signal, and outputting the modulated user signal so as to form a transmission beam corresponding to the user transmission beam number;

transmission beam selection means for selecting the transmission beam on the basis of overall reception qualities calculated from reception qualities of path delays of user signals present in the plurality of reception beams as determined by the reception beam calculation means; and transmission beam formation means receiving an output from the transmission beam switching means and forming said plurality of transmission beams.

* * * * *